United States Patent
Waldschütz et al.

(10) Patent No.: US 12,087,958 B2
(45) Date of Patent: Sep. 10, 2024

(54) DEVICE WITH A CARRIER HAVING AN OPENING FOR HOLDING A BATTERY CELL ON THE CASING SIDE

(71) Applicant: Raiffeisenlandesbank Oberösterreich Aktiengesellschaft, Linz (AT)

(72) Inventors: Gerhard Waldschütz, Freistadt (AT); Wolfgang Schmudermaier, Eisgarn (AT); Florian Drexler, Freistadt (AT); Helmut Kastler, Freistadt (AT); Peter Dobusch, Grünbach (AT)

(73) Assignee: John Deere Electric Powertrain LLC, Moline, IL (US)

( * ) Notice: Subject to any disclaimer, the term of this patent is extended or adjusted under 35 U.S.C. 154(b) by 492 days.

(21) Appl. No.: 17/616,991

(22) PCT Filed: Jun. 8, 2020

(86) PCT No.: PCT/AT2020/060228
§ 371 (c)(1),
(2) Date: Dec. 6, 2021

(87) PCT Pub. No.: WO2020/243765
PCT Pub. Date: Dec. 10, 2020

(65) Prior Publication Data
US 2022/0247026 A1 Aug. 4, 2022

(30) Foreign Application Priority Data
Jun. 7, 2019 (AT) .............................. A 50517/2019

(51) Int. Cl.
*H01M 50/244* (2021.01)
*H01M 10/48* (2006.01)
(Continued)

(52) U.S. Cl.
CPC ......... *H01M 50/244* (2021.01); *H01M 10/48* (2013.01); *H01M 10/486* (2013.01);
(Continued)

(58) Field of Classification Search
CPC .. H01M 50/244; H01M 10/48; H01M 10/486; H01M 10/613; H01M 50/213;
(Continued)

(56) References Cited

U.S. PATENT DOCUMENTS 10,483,606 B2    11/2019  Kreisel et al.
11,411,267 B2 *  8/2022   Menzl ................ H01M 50/204
(Continued)

FOREIGN PATENT DOCUMENTS

DE   102015013377 A1   4/2017
DE   102018118083 A1   1/2019
(Continued)

OTHER PUBLICATIONS

English language abstract of JP 2019-29175 A, Feb. 21, 2019.
English language abstract of JP 2016-136472 A, Jul. 28, 2016.

*Primary Examiner* — Abdullah A Riyami
*Assistant Examiner* — Nader J Alhawamdeh
(74) *Attorney, Agent, or Firm* — Tiajoloff & Kelly LLP

(57) ABSTRACT

The invention relates to a device with a carrier (3) having an opening (1) for receiving a battery cell (2) on the casing side, which carrier (3) has a measuring channel (5) extending between a carrier outer wall (4) and the opening (1) for a measuring head (6) which has a locking device for a measuring position set against the battery cell casing (7). In order to design a device of the type described at the beginning in such a way that a regulation adapted to the inhomogeneous distribution of the state variables within a battery module and within a battery cell is made possible and, at the same time, an industrial production of battery (Continued)

Figure 1:
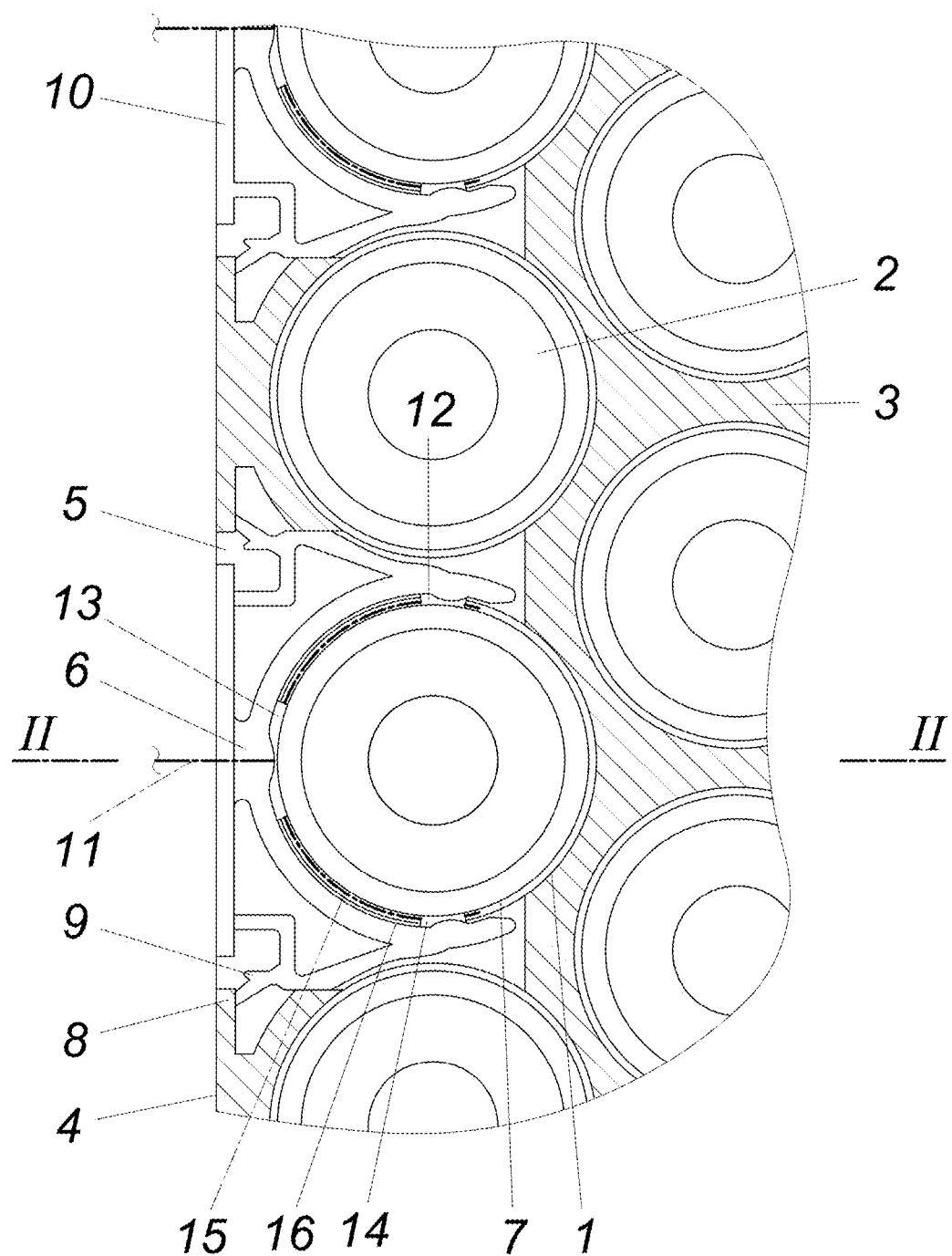

modules, in particular their assembly, is favored, it is proposed that the measuring head (6) has a galvanic contact point (12) of a voltage sensor, which contact point (12), in the measuring position, rests against the battery cell casing (7) which forms an electrical pole.

20 Claims, 3 Drawing Sheets

(51) Int. Cl.
   *H01M 10/613* (2014.01)
   *H01M 50/213* (2021.01)
   *H01M 50/262* (2021.01)
   *H01M 50/264* (2021.01)
   *H01M 50/284* (2021.01)
   *H01M 50/569* (2021.01)

(52) U.S. Cl.
   CPC ....... *H01M 10/613* (2015.04); *H01M 50/213* (2021.01); *H01M 50/262* (2021.01); *H01M 50/264* (2021.01); *H01M 50/284* (2021.01); *H01M 50/569* (2021.01)

(58) Field of Classification Search
   CPC ............ H01M 50/262; H01M 50/264; H01M 50/284; H01M 50/569; H01M 10/4285; H01M 50/107; H01M 50/545; H01M 10/425; H01M 10/643; H01M 10/625; H01M 2200/10; H01M 2200/20; H01M 2220/20; H01M 50/249; Y02E 60/10
   See application file for complete search history.

(56) References Cited

U.S. PATENT DOCUMENTS

| | | |
|---|---|---|
| 2006/0028183 A1 | 2/2006 | Izawa et al. |
| 2006/0103346 A1 | 5/2006 | Misu et al. |
| 2011/0097617 A1* | 4/2011 | Gu ................. H01M 10/613 |
| | | 429/120 |
| 2012/0141839 A1 | 6/2012 | Hong et al. |
| 2015/0349390 A1 | 12/2015 | Aiba et al. |
| 2016/0172727 A1* | 6/2016 | Chan ............... H01M 10/613 |
| | | 429/120 |
| 2018/0316074 A1 | 11/2018 | Kreisel et al. |
| 2021/0408623 A1* | 12/2021 | Menzl ............. H01M 10/6556 |
| 2022/0247026 A1* | 8/2022 | Waldschütz ........ H01M 50/264 |

FOREIGN PATENT DOCUMENTS

| | | | |
|---|---|---|---|
| JP | 2016136472 A | * | 7/2016 |
| JP | 2019-29175 A | | 2/2019 |
| WO | 2007/108851 A1 | | 9/2007 |

\* cited by examiner

DEVICE WITH A CARRIER HAVING AN OPENING FOR HOLDING A BATTERY CELL ON THE CASING SIDE

FIELD OF THE INVENTION

The invention relates to a device with a carrier having an opening for holding a battery cell on the casing side, which carrier has a measuring channel extending between an outer wall of the carrier and the opening for a measuring head which has a locking device for a measuring position placed against the battery cell casing.

DESCRIPTION OF THE PRIOR ART

The measurement of state variables such as voltage or temperature of battery cells is a basic requirement for carrying out fundamental processes in the field of electromobility, such as determining the state of charge of the battery module, adjusting the optimum operating temperature during charging or driving, or creating efficient charging conditions.

Battery modules are known from the prior art that accommodate battery cells and are equipped with temperature, voltage and humidity sensors (DE102018118083A1). However, the disadvantage of this arrangement of sensors is that the measurement of the state variables takes place on the top side, i.e. on the pole side and at a distance from the battery cells. This is a problem in that the state variables have been shown to be inhomogeneous within the battery module and even within a battery cell. In particular, a determination of the state variables in the region of the top surfaces often leads to distorted measurement results because the relevant chemical processes occur remotely from both top and bottom surfaces. This complicates any loop control, such as temperature control of the batteries, because, for example, the measured temperature value at the poles does not correspond to the temperature value in the individual battery cells. This results in undesirable fluctuations in the operating parameters in the battery module and in the battery cells, which reduces their service life, performance and operational reliability.

This problem also exists in the case of temperature control of individual battery cells of a battery module with the aid of a fluid flowing directly onto the battery cells (DE102015013377A1), although in this case a more dynamic control and associated smaller fluctuations in the operating parameters are made possible in principle.

SUMMARY OF THE INVENTION

The invention is thus based on the object of enabling a regulation adapted to the inhomogeneous distribution of the state variables within a battery module and within a battery cell and, at the same time, of facilitating the industrial production of battery modules, in particular their assembly.

The invention solves the stated problem in that the measuring head has a galvanic contact point of a voltage sensor which, in the measuring position, is in contact with the battery cell casing forming an electric pole. As a result of these features, the battery cell can be introduced into the opening and aligned with the carrier in a simple manner with the measuring head retracted into the measuring channel or completely removed therefrom, without there being any fear of damage to the measuring head, even during industrial joining processes. The measuring channel remains accessible via the outer wall of the carrier, so that the measuring head can be inserted after the battery cell has been joined and positioned against the battery cell casing in a predefined measuring position in such a way that, for example, galvanic contact or good heat transfer is achieved. In this way, state variables can be recorded directly at the battery cell casing and thus close to the chemical reaction center and made available for highly dynamic regulation. The measuring channel thereby preferably extends transversely to a longitudinal axis of the battery cell within the carrier. If a plurality of openings for a plurality of individual battery cells are provided on a carrier according to the invention, a plurality of measurement channels to at least some of these battery cells may be provided, so that even inhomogeneous state variables within a battery module can be detected with a carrier according to the invention. Depending on the relative position of the carrier to the battery cell or battery cells, the measurement of the state variables can be carried out at different positions on the battery cell casing, so that positions representative of the state variables can be selected for the measurement. In the measuring position, the measuring head can be fixed by means of a locking device designed, for example, as a latching connection. For maintenance or replacement of a defective measuring head, this locking device can also be designed to be releasable. Finally, signal lines for the measuring head can also be routed to the outside via the measuring channel.

In order to create simple manufacturing and assembly conditions for a releasable locking device, in particular in the case of a carrier or a measuring head made of plastic, the measuring head can have a latching spring engaging behind a latching stop of the measuring channel in the measuring position. The assignment of the latching spring to the measuring head and the latching stop to the measuring channel results in simple manufacturing conditions, because a recess required for a spring element can be integrated more easily into the measuring head, which is subject to less mechanical stress. During the assembly process, the measuring head can be inserted into the measuring channel and automatically latches in the measuring position by the latching spring positively engaging behind the latching stop. For better alignment, several latching springs or latching stops can also be provided for this purpose. Particularly advantageous conditions result if the measuring head has, on its end section facing away from the battery cell, a cover plate closing off the measuring channel towards the outer wall of the carrier. This cover plate may have a passage opening for releasing the latching spring. In addition, the cover plate may comprise a further passage opening or a connection socket for a signal line leading to the sensors.

Battery cells form two electrical poles, which are usually accessible as electrical contact points at predefined positions. However, in commercially available battery cells, in particular in cylindrical round cells, one pole forms the battery cell casing, which is insulated for easier handling by a coating, for example. However, because the predefined electrical contact points are arranged at positions which are unfavorable for the measurement of all state variables, as explained above, it is proposed, for a more compact design, that the measuring head has a galvanic contact point of a voltage sensor which, in the measuring position, is in contact with the battery cell casing forming an electrical pole. In the event that the battery cell casing is electrically insulated, this can be peeled or stripped prior to joining, at least in the region of the measuring channel that opens into the opening, so that a pole can be contacted via the battery casing. An electrical contact can be established between the voltmeter and the battery cell casing as a pole via the galvanic contact point of the measuring head, because the galvanic contact point is in contact with the battery cell casing in the measuring position and enables the voltage to be tapped.

In order to be able to determine critical operating conditions at an early stage, it is proposed that the measuring head comprises a deformation sensor for measuring a casing-side expansion of the battery cell. It has been shown that critical operating conditions can be detected at an early stage via slight deformations of the battery cell. Particularly in the case of battery cells with a wound electrode core, such deformations can be detected in particular at the battery cell casing, so that a casing-side tap in particular permits early fault detection. In a particularly favorable embodiment, the deformation sensor can be a strain gauge attached to the measuring head at a suitable location, possibly pretensioned.

To avoid an overdetermined force system, it may be advantageous if the battery cell is floating within the opening, for example via seals. In the event of vibrations or other mechanical loads, it may occur that the relative position of the battery cell to the carrier within the opening may therefore change during operation. Therefore, in order to provide reliable measurements regardless of the relative position of the battery cell to the carrier within the opening, it is proposed that the measuring head forms a clamp partially circumferentially encompassing the battery cell casing in the measuring position. Since the clamp partially circumferentially embraces the battery cell casing, relative movements between the measuring head and the battery cell are avoided. In addition, the clamp offers the possibility of attaching different sensors at a plurality of measuring points, with matching measuring conditions existing due to the non-positive clamping connection along the clamping arms, in particular in the region of the free end sections. Furthermore, a deformation sensor such as a strain gauge can be attached in particular in the area of the bifurcation of the clamping arms. These measurement conditions can be further improved if there is not only a force fit but also a form fit between the clamp and the battery cell, in that the clamp arms engage behind the largest diameter of the battery cell starting from the mouth of the measurement channel. In a simple embodiment of the invention, the clamp may form the locking device for the measuring head. In a preferred embodiment, the clamp complements a latching connection provided in the measuring channel, thereby providing additional stabilization of the battery cell within the opening of the carrier.

In order to design a measurement more flexibly with regard to both the state variables to be measured and battery geometries, it is proposed that the end section of the measuring head facing the battery cell casing in the measuring position forms a fastening section for a flexible sensor carrier. In this way, the sensor carrier can be the same for a variety of different battery cell geometries, because its adaptation to a specific battery cell geometry is effected via the shaping of the fastening section of the measuring head. This fastening section can be set back relative to a stop surface of the end section in such a way that a sufficient mounting height for the individual sensors is achieved. The distance between the fastening section and the stop surface can thereby vary along the end section, so that individual sensors can be pressed against the battery cell casing with varying force or fastened at a distance therefrom. In a particularly simple embodiment, the fastening section forms a groove extending along the end section, wherein the base of the groove may have elevations and/or depressions. Moreover, by designing the measuring head and the sensor carrier as two components, the fields of application of the measuring heads can be increased by prefabricating the sensor carriers with sensors for different state variables at different positions on the sensor carrier, and thereafter placing them on the measuring head.

As already mentioned at the beginning, a particularly dynamic regulating behavior, especially for the temperature of the battery cells, can be achieved by a cooling fluid flowing directly onto the battery cells. For such a regulation, however, a detection of the state variables with a short time delay and preferably directly in the flowed-on area of the battery cells is required. The invention therefore also relates to the fact that the carrier delimits a fluid flow channel through which the battery cell passes, and that a seal is arranged downstream of the measurement channel opening in the opening in the direction of the fluid flow channel. Accordingly, both the seal with respect to the fluid flow channel between the battery cell casing and the carrier and the measurement of the state variables at the battery cell casing can be accommodated directly downstream of this seal within the carrier, so that not only a particularly compact design results, but also the measuring point can be arranged in the immediate vicinity of the fluid flow channel and thus of the region of the battery cell casing against which the fluid flows.

The device may be subjected to vibration or other mechanical stress during operation. For example, when the measuring head is locked in measuring position, mechanical stresses may occur which stress sensitive parts of the device, such as soldered electrical contacts. In order to reduce wear and mechanical stress on sensitive electrical components, it is therefore proposed that a temperature sensor for contacting the battery cell on the casing side in the measurement position is attached to the measurement head via an entropy-elastic buffer. This allows any mechanical forces that occur to be directed into the entropy-elastic buffer, which deforms reversibly and non-destructively. This prevents these forces from being directed into more sensitive parts of the device and possibly damaging them. Due to its insulating properties, the entropy-elastic buffer prevents unintentional electrical contacts between the battery cell and the measuring head. Of course, in this case, the temperature sensor must have appropriate thermally conductive insulation from the battery cell casing. In addition, the entropy-elastic buffer may be pretensioned so that the temperature sensor is pressed against the battery cell casing to ensure reliable contact between the battery cell casing and the temperature sensor at all times, even in the presence of vibration or other mechanical influences. The entropy-elastic buffer can be made of rubber, for example.

Particularly favorable assembly conditions are obtained when the measuring head is contacted with a printed circuit board via contact pins so that it can be moved in the direction of the measuring channel. The printed circuit board carries the signal lines coming from the measuring head. The resulting plug connection between the measuring head and contact pins eliminates the need for solder contacts. This not only facilitates assembly, but also increases the resistance of the connection to mechanical stress, since the height-adjustable mounting of the printed circuit boards is more flexible than a rigid solder connection. In this way, the printed circuit board and measuring head are connected with play without affecting their electrical connection. In order to regulate the force required to move the printed circuit board along the contact pins, sleeves can be provided on the printed circuit board to fix the contact pins circumferentially.

A cause for short circuits or faulty reading of the battery state variables can be avoided if a plug receptacle for the contact pins is provided on the side of the circuit board opposite the measuring channel. The plug receptacle encloses the contact pins on the circumferential side and thereby prevents both mechanical damage to the contact pins and unintentional electrical contacts between the contact pins and any conductive components present in the immediate vicinity of the device.

If state variables are measured in several devices, these can be read out simply and centrally if a pin strip and a socket strip are provided at end sections of the circuit board opposite one another transversely to the direction of the measuring channel, which are electrically connected to the measuring head via signal lines. Via the pin strips and socket strips, adjacent devices, for example of a battery stack, can be connected to one another in a simple and reversibly detachable manner, so that cable lines and installation space are saved and the measured state variables can be read out via a central output and/or a bus system. The sliding contacting of the printed circuit boards with the respective contact pins enables simple and flexible contacting of adjacent printed circuit boards.

BRIEF DESCRIPTION OF THE INVENTION

Figure 2:
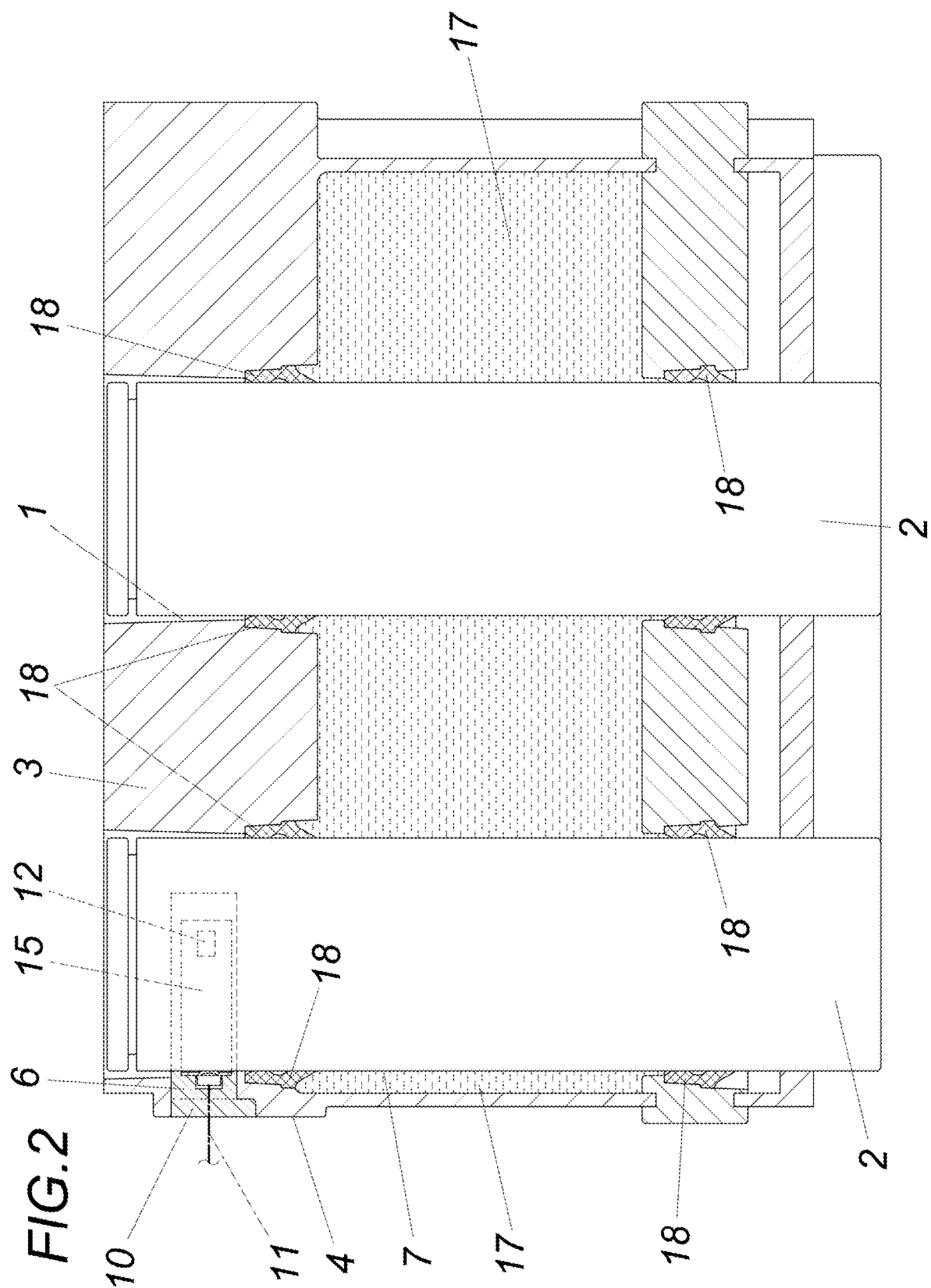
Figure 3:
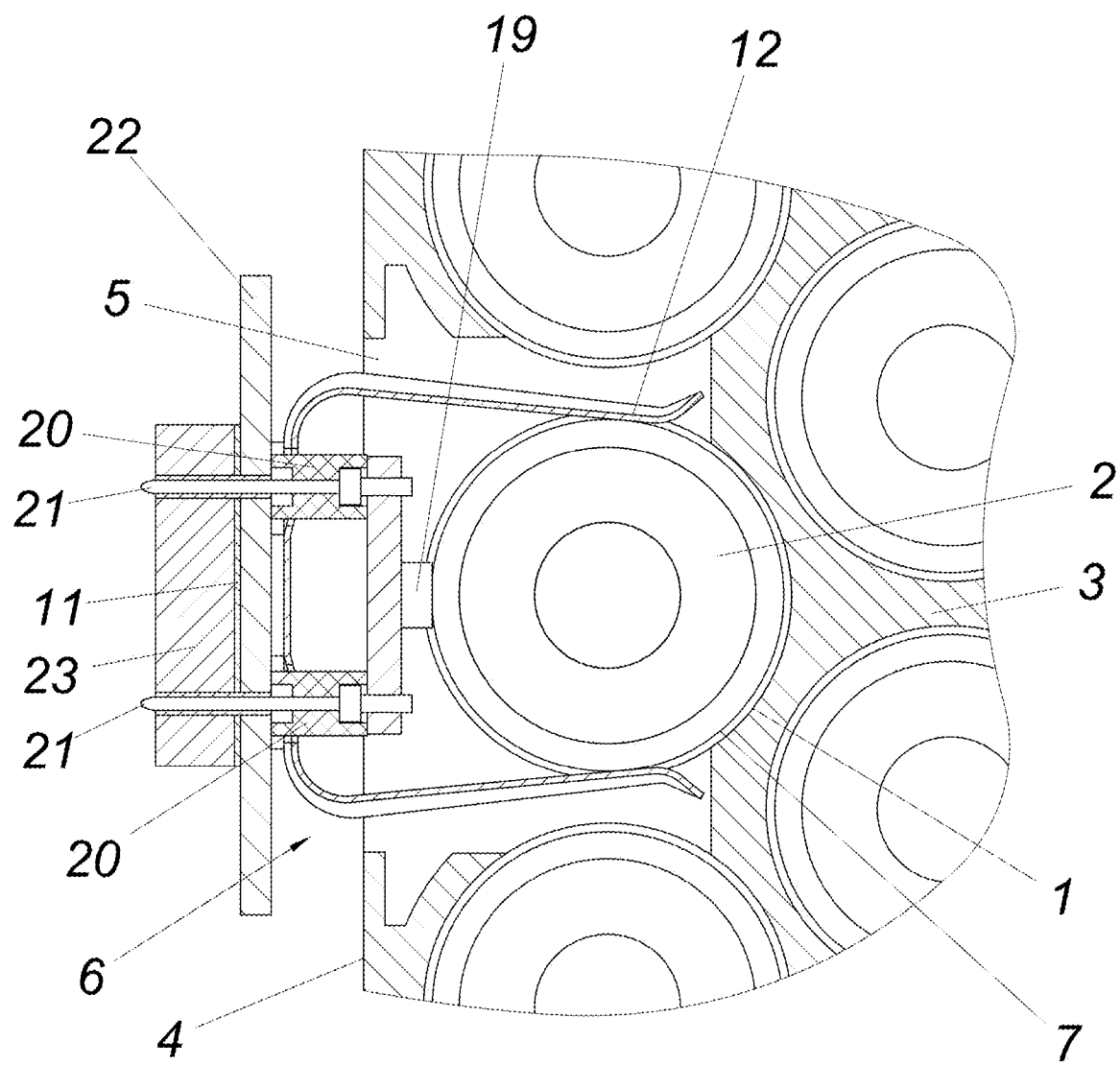

In the drawing, the subject matter of the invention is shown by way of example, wherein:

FIG. 1 shows a section of a device according to the invention with inserted battery cells, FIG. 2 shows a section along line II-II of FIG. 1 and FIG. 3 shows a sectional view, corresponding to FIG. 1, of a further embodiment of a device according to the invention with inserted battery cells.

DETAILED DESCRIPTION OF THE PREFERRED EMBODIMENTS

A device according to the invention has an opening 1 for accommodating battery cells 2 on the casing side in a carrier 3. The carrier comprises a measuring channel 5 extending between the outer wall 4 of the carrier and the opening 1. A measuring head 6 is inserted into this measuring channel 5 and fastened by means of a locking device, so that it can be placed against the battery cell casing 7. As a result, the measuring head 6 can only be inserted into the measuring channel 5 after the battery cell 2 has been inserted into the opening 1, so that the measuring head 6 does not obstruct the joining process.

When the measuring head 6 is inserted into the measuring channel 5, the measuring head 6 can be locked in the measuring position in the measuring channel 5 by means of a latching stop 8, which is engaged behind by a latching spring 9 attached to the measuring head 6. In a preferred embodiment, the latching stop 8 may be part of the outer wall 4 of the carrier. With the aid of a cover plate 10 of the measuring head 6, the measuring channel 5 is positively closed via the latching spring 9 on the latching stop 8 after the measuring head 6 has been latched in place. Since good physical contact between the measuring head 6 and the battery cell casing 7 is necessary for the measurement of certain state variables, such as the temperature at the battery cell casing 7, the form fit of the cover plate 10 with the outer wall 4 of the carrier in the engaged state of the latching spring 9 with the latching stop 8 enables a visual check as to whether the measuring head 6 has reached the predefined measuring position. The cover plate 10 may additionally comprise passage openings for releasing the latching spring 9, or for signal lines 11 leading to the sensors on the measuring head 6. The measuring head 6 comprises a galvanic contact point 12 of a voltage sensor, which contacts the battery cell casing 7 once the measuring head 6 has been locked in measuring position. In order to measure several state variables, the measuring head 6 may comprise a plurality of different sensors, such as a deformation sensor 13 for measuring the casing-side expansion of the battery cell 2 or a temperature sensor 14. The design of the measuring head 6 may be adapted to the circumstances and prevailing geometries. In the case of common cylindrical battery cells 2, the measuring head 6 can form a clamp which grips the battery cell in a force-fitting manner and, depending on the embodiment, also in a form-fitting manner. By suitable selection of the material, such as plastic, for the measuring head 6, geometries adapted to the battery cell shape can be easily implemented in terms of production technology. The sensors may be attached to a flexible sensor carrier 15 instead of being directly attached to the measuring head 6. The sensor carrier 15 is subsequently fastened to a fastening section 16 on the measuring head 6, specifically on the side facing the battery cell casing 7. This fastening section 16 is configured to allow the specific contact conditions for the various sensors attached to the sensor carrier 15, for example by means of local elevations, depressions or clamping jaws on the measuring head 6. The fastening section 16 may also form a groove extending along the end section of the measuring head 6 facing the battery cell 2, the base of the groove having corresponding elevations and depressions in order to optimize the contact and measurement conditions with respect to the different sizes and shapes of the sensors. By designing the sensor carrier 15 and the measuring head 6 as two different but connectable components, the flexible sensor carrier 15 can be used on measuring heads 6 of different geometric designs. When the measuring channel 5 is placed within the carrier 3 according to the invention, the device according to the invention can also be used on fluid-cooled battery cells 2, wherein a seal 18 is placed downstream of the mouth of the measuring channel 5 in the direction of a fluid flow channel 17 in order to prevent a flow connection between the electrically conductive components of the measuring head 6 and the fluid channel 17.

FIG. 3 shows an embodiment of the device according to the invention in which the measuring head 6 has a temperature sensor 19 for contacting the battery cell 2 on the casing side in the measuring position, and the temperature sensor 19 is attached to the measuring head 6 via an entropy-elastic buffer 20. Due to its insulating properties, the entropy-elastic buffer 20 prevents unintentional electrical contacts between the battery cell 2 and the measuring head 6 and absorbs mechanical forces that could cause damage to other components of the device. When mechanical pretension is applied to the entropy-elastic buffer 20, the temperature sensor 19 can be pressed against the battery cell casing 7. This increases the reliability of the temperature measurement in the presence of interfering mechanical vibrations. In the embodiment shown in FIG. 3, the signal lines 11 can be routed via a common printed circuit board 22, wherein the temperature sensor 19 can be mounted so as to be displaceable in the direction of the measuring channel 5 via contact pins 21 and can be electrically connected to the measuring head 6. This makes it possible to avoid rigid connections, such as solder joints, which wear more quickly in the event of mechanical vibrations caused by operation. A connector receptacle 23 can electrically shield the ends of the contact pins 21 from the environment of the device, which can prevent, for example, short circuits or incorrect reading of the battery state variables. The circuit boards 22 of a plurality of adjacent devices can be easily and reversibly electrically connected to each other by means of pin and socket strips not visible in the figure, in order to read out the state variables of a plurality of battery cells 2 of adjacent devices via a single output.

The invention claimed is:

1. A device comprising:
   a carrier having an opening holding a battery cell on a casing side thereof,
   wherein the carrier has a measuring channel that extends between an outer wall of the carrier and the opening, said measuring channel receiving a measuring head, which includes a locking device locking the measuring head in a measuring position placed against a casing of the battery cell,
   wherein the measuring head includes a galvanic contact point of a voltage sensor, wherein the contact point, when the measuring head is in the measuring position, rests against the battery cell casing and forms an electrical pole.

2. The device according to claim 1, wherein the measuring head has a latching spring that engages behind a latching stop of the measuring channel when the measuring head is in the measuring position.

3. The device according to claim 1, wherein the measuring head has a deformation sensor measuring a casing-side expansion of the battery cell.

4. The device according to claim 1, wherein the measuring head forms a clamp that partially circumferentially surrounds the battery cell casing when the measuring head is in the measuring position.

5. The device according to claim 1, wherein an end section of the measuring head facing the battery cell casing in the measurement position forms a fastening section of a flexible sensor carrier.

6. The device according to claim 1, wherein the carrier delimits a fluid flow channel through which the battery cell extends, and wherein a seal is arranged downstream of a mouth of the measurement channel in the opening in the direction of the fluid flow channel.

7. The device according to claim 1, wherein a temperature sensor contacting the battery cell on the casing side in the measurement position is attached to the measurement head via an entropy-elastic buffer.

8. The device according to claim 1, wherein the measuring head is in contact with a printed circuit board displaceably via contact pins in the direction of the measuring channel.

9. The device according to claim 8, wherein a plug receptacle receiving the contact pins is provided on a side of the printed circuit board opposite the measuring channel.

10. The device according to claim 8, wherein a pin strip and a socket strip are provided at end sections of the printed circuit board opposite transversely to the direction of the measuring channel, and are electrically connected to the measuring head via signal lines.

11. The device according to claim 2, wherein the measuring head has a deformation sensor measuring a casing-side expansion of the battery cell.

12. The device according to claim 2, wherein the measuring head-forms a clamp that partially circumferentially surrounds the battery cell casing when the measuring head is in the measuring position.

13. The device according to claim 3, wherein the measuring head-forms a clamp that partially circumferentially surrounds the battery cell casing when the measuring head is in the measuring position.

14. The device according to claim 2, wherein an end section of the measuring head facing the battery cell casing in the measurement position forms a fastening section of a flexible sensor carrier.

15. The device according to claim 3, wherein an end section of the measuring head facing the battery cell casing in the measurement position forms a fastening section of a flexible sensor carrier.

16. The device according to claim 4, wherein an end section of the measuring head facing the battery cell casing in the measurement position forms a fastening section of a flexible sensor carrier.

17. The device according to claim 2, wherein the carrier delimits a fluid flow channel through which the battery cell extends, and wherein a seal is arranged downstream of a mouth of the measurement channel in the opening in the direction of the fluid flow channel.

18. The device according to claim 3, wherein the carrier delimits a fluid flow channel through which the battery cell extends, and wherein a seal is arranged downstream of a mouth of the measurement channel in the opening in the direction of the fluid flow channel.

19. The device according to claim 4, wherein the carrier delimits a fluid flow channel through which the battery cell extends, and wherein a seal is arranged downstream of a mouth of the measurement channel in the opening in the direction of the fluid flow channel.

20. The device according to claim 5, wherein the carrier delimits a fluid flow channel through which the battery cell extends, and wherein a seal is arranged downstream of a mouth of the measurement channel in the opening in the direction of the fluid flow channel.

* * * * *